(12) United States Patent
Van Laere

(10) Patent No.: US 7,699,336 B2
(45) Date of Patent: Apr. 20, 2010

(54) PROTECTIVE HOUSING FOR A TRAILER COUPLER

(76) Inventor: Jason Robert Van Laere, 20908 Briar Rose Dr., Macomb Township, MI (US) 48044

( * ) Notice: Subject to any disclaimer, the term of this patent is extended or adjusted under 35 U.S.C. 154(b) by 125 days.

(21) Appl. No.: 11/975,294

(22) Filed: Oct. 18, 2007

(65) Prior Publication Data

US 2009/0102159 A1    Apr. 23, 2009

(51) Int. Cl.
*B60D 1/60* (2006.01)
(52) U.S. Cl. .................................... 280/507
(58) Field of Classification Search .............. 280/507, 280/511
See application file for complete search history.

(56) References Cited

U.S. PATENT DOCUMENTS

| 3,605,457 | A | 9/1971 | Foster |
| 3,924,878 | A | 12/1975 | Utman et al. |
| 4,774,823 | A | 10/1988 | Callison |
| 5,154,440 | A | 10/1992 | Dolan et al. |
| 7,246,810 | B2 * | 7/2007 | Bussiere et al. ............ 280/507 |

* cited by examiner

*Primary Examiner*—Tony H. Winner
(74) *Attorney, Agent, or Firm*—VanOphem & VanOphem, P.C.

(57) ABSTRACT

An anti-theft device for a towed trailer vehicle wherein a pivotable cover housing is mounted to the tongue of the trailer in spaced relation to the socket lock mechanism of a conventional ball socket attachment of a trailer hitch bar. The protective housing adapts to all standard ball and socket arrangements, does not require extensive rework of the tongue of the trailer, has adequate securing means, is low cost, and provides anti-theft protection while the trailer is in tow, as well as when the trailer is parked and/or unhitched from the towing vehicle.

4 Claims, 2 Drawing Sheets

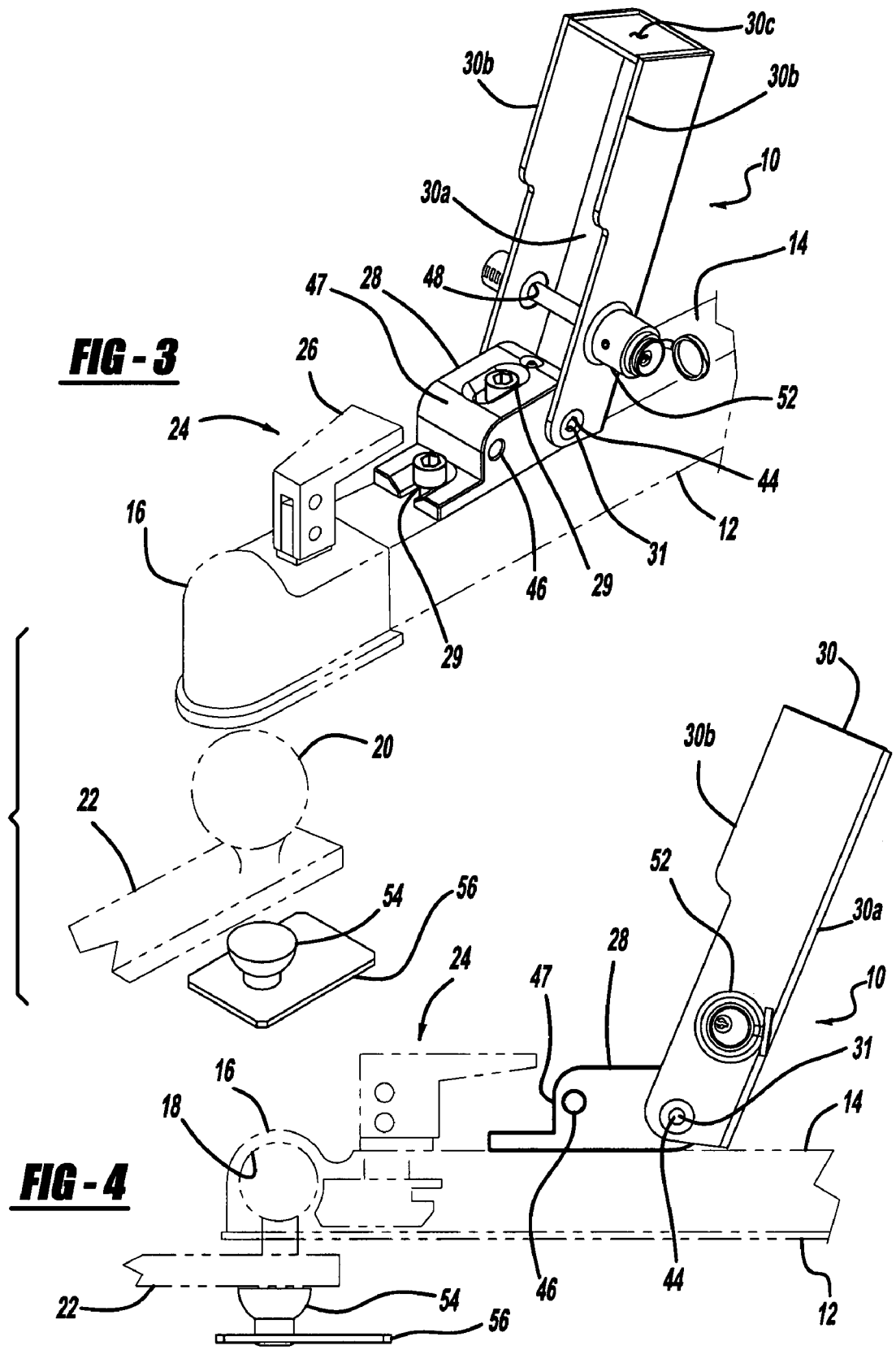

PROTECTIVE HOUSING FOR A TRAILER COUPLER

CROSS-REFERENCE TO RELATED APPLICATIONS

None.

FEDERALLY SPONSORED RESEARCH OR DEVELOPMENT

None.

REFERENCE TO A SEQUENCE LISTING

None.

BACKGROUND OF THE INVENTION

The invention is a device for preventing theft of a towed trailer vehicle and, more specifically, a security device which is mounted to the end portion of the tongue of the trailer in spaced relation to the socket lock mechanism for the towing ball and is adapted to lock over the socket lock mechanism to prevent the detachment of an attached trailer vehicle.

The theft of trailer vehicles is a wide spread problem. Since most recreational vehicles are transported by trailer it is becoming increasingly common for unauthorized persons to steal these trailers by simply connecting their towing vehicle to the trailer hitch ball sockets and drive off with the recreational vehicles as mounted or stored on the trailer since they are often left unattended and unguarded for long periods of time.

Commonly, the trailer hitch coupling is not provided with a lock which will prevent unauthorized opening of the hitch mechanism and removal of the trailer from the draft vehicle. The prior art has disclosed the use of pad locks and special locks to attempt to provide a degree of security but these simple devices are no match for a thief with the proper tools to destroy or manipulate the lock to easily obtain access to the trailer and its cargo of recreational vehicles.

The prior art discloses selective inadequate solutions to similar problems. For example, Callison, U.S. Pat. No. 4,774, 823, discloses the use of an external padlock construction attached to the underside of the tongue which provides a cover guard and is secured by a padlock to the tongue of the hitch to cover the conventional socket to which a ball of a trailer hitch on the towing vehicle attaches to prevent theft of an unattended trailer. To use the device, some modifications of the trailer tongue or coupler is needed, and the cover guard may need to be re-contoured to fit certain couplers. Unfortunately, the padlock offers little security against the use of a hacksaw to quickly remove the keeper member.

Dolan et al., U.S. Pat. No. 5,154,440, discloses a locking mechanism for a trailer coupler having a release handwheel to force the ball firmly into the socket. A retaining shelf formed with two openings, is hingedly attached to the trailer tongue and pivots the end portion to receive the periphery of the user manipulated handwheel to cover the ball. When the retaining shelf is pivoted, a locking flange attached to the tongue moves through a locking flange aperture so that a padlock may be attached through a locking aperture in the locking flange to secure the retaining shelf in place. The padlock is completely exposed and accessible for easy access and manipulation as set forth above.

Completely enclosing the ball socket has been attempted in the past. For example, Foster, U.S. Pat. No. 3,605,457, discloses a trailer hitch lock wherein a housing is arranged to enclose the ball socket and outer portions of the trailer hitch. The housing consists of a cover which is enclosed on the bottom by a base plate and a lock plate. A substrate towing ball is carried by the base plate with side plates welded thereto. The substrate towing ball is arranged for insertion into the ball socket of the hitch. Both the base plate and lock plate are moveable relative to the housing to allow the apparatus to be secured and removed from the hitch. The cover is pivotally mounted to the base plate. The lock plate holds a lock assembly to secure the pivotable cover to the housing side walls.

This type of trailer hitch lock obviously has very limited applications since today most ball elements of a hitch are permanently fixed to the tongue so that the trailer hitch lock of Foster could not be used since it allows no opening in the housing for a ball that is not removable from the tongue.

Utman et al., U.S. Pat. No. 3,924,878, also disclosed a protective housing and padlock assembly for shielding a standard trailer coupler and protecting the padlock from excessive exposure to weathering and highway abrasions. The Utman et al. invention provides for a protective housing characterized as having a base plate portion and a cover plate portion defining a hollow structure open at one or both of its ends for being engaged over and around a trailer coupler and a padlock assembly associated therewith. The associated padlock assembly may comprise a separate standard padlock or a padlock incorporated into the assembly of the protective housing means. The hollow structure may be formed as an integral rigid structure from steel or other known materials which offer desired protection. The protective housing means includes a cutout slot formed in the forward edge of its base plate portion and extending rearwardly along the base plate portion for a sufficient distance to allow the protective housing to be slidably engaged and fitted over a variety of sizes and forms of standard couplers with the base plate portion being received under an actuating lever assembly associated with such standard couplers. The protective housing means further includes a bearing block or post rigidly affixed in its hollow interior to engage and fix the position of a sliding locking bar (which may be part of a standard bicycle lock) of the padlock assembly. The bearing block or post further functions to guide a U-shaped shackle portion of the padlock assembly into locking engagement with its locking bar portion. The arrangement is such that the movable portion of the padlock assembly fixes and secures the protective housing in place while it is carrying out its usual function of securing the lever arm of the coupler, and thus, no additional locking devices and keys are required for the use of the protective housing means.

Unfortunately, the protective housing of Utman et al. is bulky and complicated, as well as requires extensive rework of the tongue of the trailer in order to accommodate the welded construction of the housing and insure its proper functioning with the standard ball and socket arrangement. It is also subject to the same limitations as those described above with respect to the use of a padlock which is easily violated.

Accordingly, what is needed is a protective housing for shielding the standard trailer coupler which is simple to operate, adapts to all standard ball and socket arrangements including the socket lock mechanism to allow unobstructed access to secure the trailer to the hitch bar, does not require extensive rework of the tongue of the trailer, has adequate securing means, and is low cost and is constructed of few parts.

SUMMARY OF THE INVENTION

The invention is a relatively simple pivotable housing cover used in conjunction with a housing base which easily mounts to the tongue of any trailer to provide a protective housing so as to prevent tampering or theft of the trailered vehicle, whether while in tow or when the trailer is disconnected from the tow vehicle and in a parked condition. The housing base is adapted to mount directly to the tongue of the trailer in spaced relation to the ball pedestal mounted to the end of the hitch bar as well as socket lock mechanism. The housing base is directly attached to the tongue of the trailer by two threaded screws which are adapted to thread into two complementary threaded holes which must be tapped into the tongue of the trailer. The threaded screws are mounted in slots made within the housing base to provide sliding adjustment of the housing base relative to the spherical ball pedestal mounted at the end of the hitch bar as well as the socket lock mechanism so as to permit unobstructed access to the socket lock mechanism in order to secure the trailer to the hitch bar. One end of the housing base contains a through hole to which is mounted the pivoting housing cover. A hinge pin is press-fit into the through hole in the housing base. The ends of the hinge pin extend from the housing base sufficiently to mount into respective holes in each of the side walls of the U-shaped housing cover. By this arrangement the housing cover can pivot from an open position, which provides complete unobstructed access to a conventional socket lock mechanism, to allow a user to lock or unlock the trailer to/from a towing vehicle to a closed position such that the pivotable housing cover is cantilevered over the socket lock mechanism and associated conventional spherical socket housing which is locked onto the spherical ball member of the conventional ball pedestal attached to the hitch of the towing vehicle. When the cover is pivoted to a closed position, the cantilevered cover extends from its housing base to completely cover the socket lock mechanism and a key locking means is mounted between the housing base and the housing cover to prevent the cover from pivoting with respect to the housing base such that no access can be gained to the socket lock mechanism while the trailer is attached to the towing vehicle.

The protective housing cover also prevents unauthorized access to the conventional socket lock mechanism when the trailer is parked and/or is disconnected from the towing vehicle to prevent tampering or theft of the trailer and its contents. For this purposes a partial spherical ball member is securely mounted to a plate member. The partial spherical ball is mounted into the conventional interior spherical socket of the spherical socket housing and locked by the socket lock mechanism to hold the partial spherical ball member and plate member within the spherical socket housing and thereby prevent anyone from attempting to hook up the unattended trailer to a towing vehicle.

BRIEF DESCRIPTION OF THE DRAWINGS

FIG. 3 is a perspective view of the protective cover housing with the cover shown in the open position to allow access to the socket lock mechanism; and FIG. 4 is a side view of the protective cover housing in the open, unlocked position.

DETAILED DESCRIPTION OF THE PREFERRED EMBODIMENT

Figure 1:
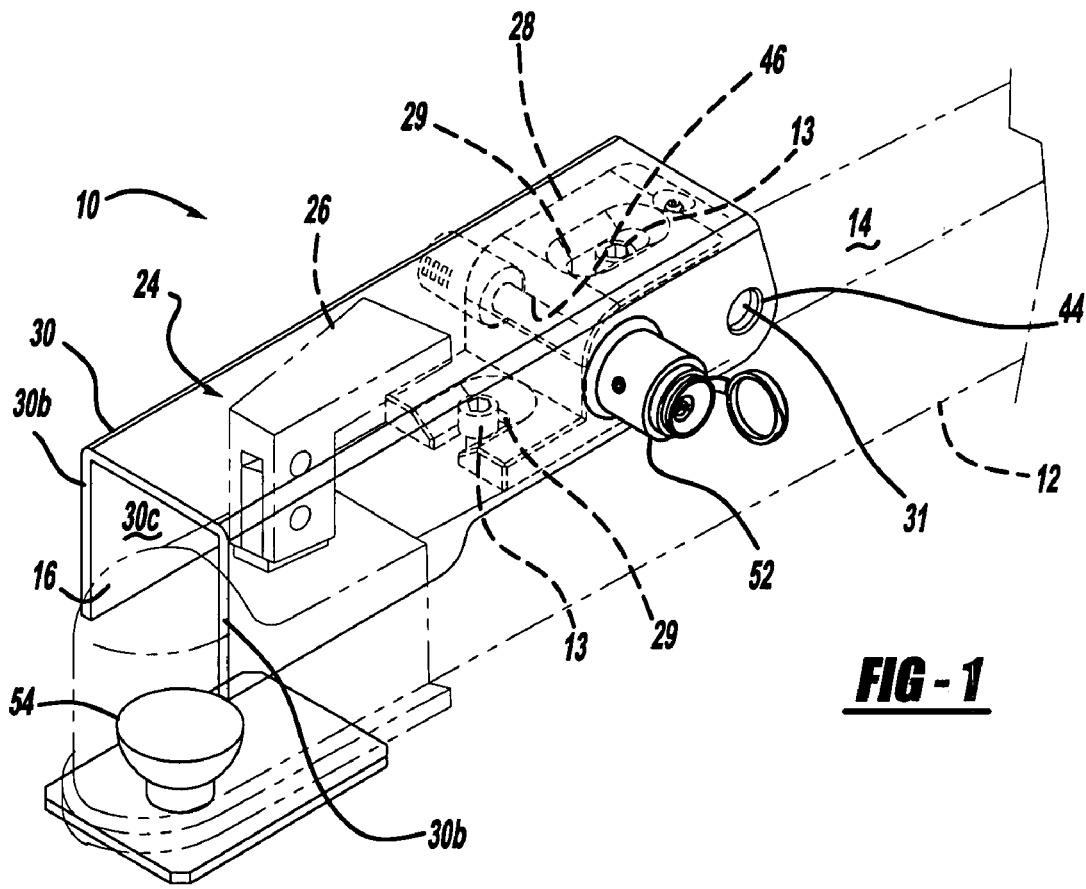
FIG. 1 is a perspective view of the invention with the protective cover housing securely locked to the housing base to prevent access to the socket lock mechanism mounted to the tongue of the trailer shown in hyphenated lines.

The invention is a device for preventing theft of a towed trailer vehicle in the form of a pivotable housing cover used in conjunction with a housing base which conveniently mounts to the tongue of any trailer with two threaded socket head screws to provide a protective housing so as to prevent tampering or theft of the trailer vehicle while in tow or when the trailer is disconnected from the towed vehicle and in a parked condition. FIGS. 1-4 illustrates the protective housing 10 mounted to a trailer tongue 12 constructed in accordance with conventional fabrication techniques defining a generally rectangular cross-sectional U-shaped member having an upper surface 14. The conventional trailer tongue 12 generally includes a spherical socket housing 16 which defines an interior spherical socket surface 18 adapted to mount to the spherical ball member 20 secured to a conventional hitch bar 22 of the towing vehicle. The socket lock mechanism 24 is mounted to the upper surface 14 of the trailer tongue 12 so as to provide convenient access by the user to the cam lever 26 and allow the user to latch and unlatch the spherical socket housing 16 to the spherical ball member 20 of the towing vehicle's hitch bar 22.

The housing base 28 is adapted to mount directly to the upper surface 14 of the trailer tongue 12 in spaced relation to the socket lock mechanism 24 as well as in spaced relation to the interior spherical socket surface 18 as is conventional. The housing base 28 is spaced from the socket lock mechanism 24 to prevent a user from injuring his hand when the socket lock mechanism 24 is operated. The socket lock mechanism 24 is operative to lock the trailer tongue 12 of the trailer to the hitch bar 22 of the towing vehicle (not shown) by placing the spherical socket housing 16 over the spherical ball member 20 attached to the hitch bar 22 and thereafter pivoting the cam lever 26 of the socket lock mechanism 24 from an open position to a locked position as is conventional. The location of the housing base 28 is adjustable since the holes provided through the housing base 28 are in the form of slots 29 so that the threaded socket head screws 13 used to lock the housing base 28 to the trailer tongue 12 can be loosened and allow sliding adjustments of the housing base 28 relative to the location of the cam lever 26 of the socket lock mechanism 24 to adjust the position of the protective housing cover 30, so that it cannot interfere or cause injury to a user's hand during the operation of the cam lever 26 while connecting or disconnecting the trailer.

The housing cover 30 is attached to the housing base 28 by the use of a pivot pin 31 mounted in a through aperture or hole 34 in the housing base 28 at one end thereof. A pivot pin 31 is press-fit into a through hole 34 of the housing base 28 and is a predetermined length so that a portion of the pivot pin 31 will extend beyond the side walls of the housing base 28 for receiving the housing cover 30. The housing cover 30 is generally a U-shaped construction having a web member 30a with an extending wall flange 30b at each end thereof. One end 30c of the U-shaped construction is closed so that when the housing cover 30 is closed and locked, no access can be gained to the cam lever 26 of the socket lock mechanism 24. To attach the housing cover 30 to the housing base 28, the housing cover 30 has at one end thereof, a hole 44 in each wall of the pivoting cover housing 30, which is mounted to the pivot pin 31 after the pivot pin 31 has been press-fit into the housing base 28. The size of the hole 44 in the housing cover 30 is sufficiently greater than the diameter of the pivot pin 31 so as to permit a sliding fit to allow the housing cover 30 to easily pivot about the pivot pin 31 as will be described hereinafter.

Figure 2:
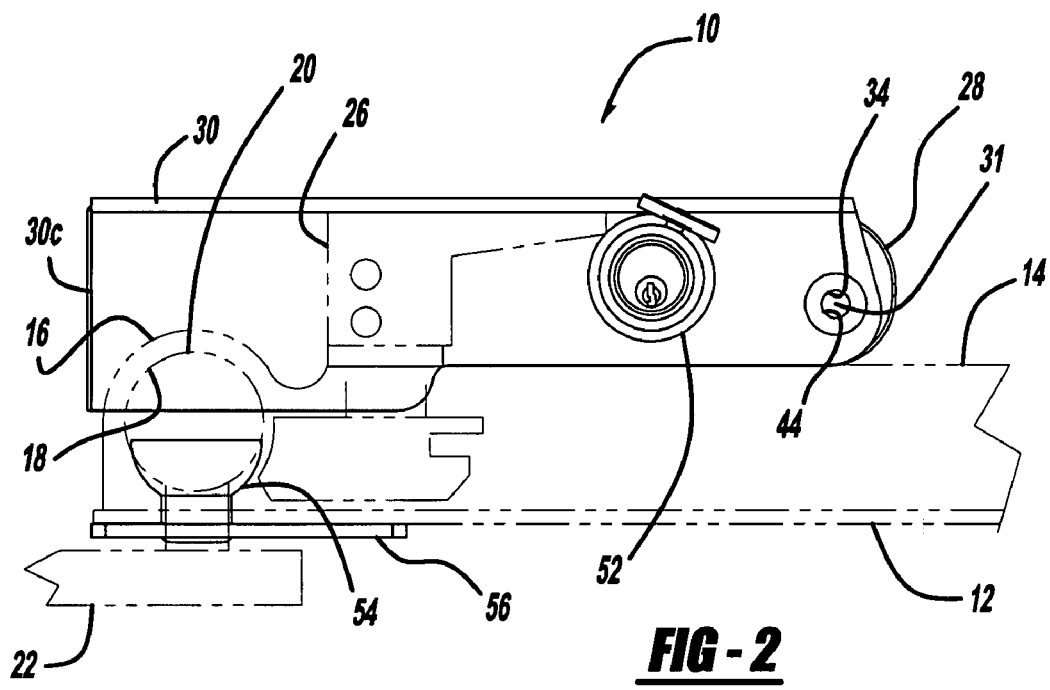
FIG. 2 is a side view of the invention wherein the protective cover housing is locked to its housing base with a key lock to prevent access to the socket lock mechanism to connect or disconnect from the spherical socket on the tongue of the trailer.

The housing base 28 has a second through hole 46 at a front portion 47 thereof which is aligned with complimentary apertures 48 in the extending wall flanges 30b of the generally U-shaped housing cover 30. The through hole 46 in the front portion 47 of the housing base 28 is adapted to have mounted therein a coupler trailer lock mechanism 52 consisting of a precision pin tumbler mechanism which extends completely through the apertures 48 of the housing cover 30, as well as a through hole 46 of the housing base 28 so as to enable securing the housing cover 30 to the housing base 28 when the housing cover 30 is pivoted to its fully closed position as illustrated in FIGS. 1 and 2. The coupler trailer lock mechanism 52 is a conventional pin tumbler mechanism available from Master Lock Company.

The present invention is a relatively simple theft deterrent housing cover 30 used in conjunction with the housing base 28 to provide a protective housing 10 so as to prevent tampering or theft of a trailer vehicle, whether while in tow or when the trailer is disconnected from the towing vehicle and/or in a parked condition.

In operation, when it is desirous to use the trailer for whatever activity, the trailer tongue 12, by its socket locking mechanism 24, is secured or coupled to the hitch bar 22 by actuating the socket lock mechanism 24 and raising the cam lever 26 to an upward position which allows the spherical ball member 20, mounted to the end of the hitch bar 22, to be received and secured within the interior spherical socket surface 18 of the spherical socket housing 16. Thereafter, the cam lever 26 of the socket lock mechanism 24 is moved to a lower position so as to lock the trailer tongue 12 to the hitch bar 22 of the towing vehicle. During this activity, the housing cover 30 is pivoted to the open position which allows unimpeded access to a user to connect or disconnect a trailer to the towing vehicle since the cantilevered housing cover 30 and housing base 28 are both conveniently spaced from the cam lever 26, the likelihood of injury to a user's hand by manipulating the cam lever 26 is completely eliminated.

To prevent access by anyone to the socket lock mechanism 24, while the trailer is in use, the anti-theft housing cover 30 is pivoted from its open position as shown in FIGS. 3 and 4 to a closed position, shown in FIG. 2, such that the pivotal housing cover 30 completely covers and cantilevers the socket lock mechanism 24 and associated cam lever 26. The coupler trailer lock mechanism 52 is then mounted in the apertures 46 and 48 of the housing base 28 and respective extending wall flange members 30b and locked with a key to secure the protective housing cover 30 in place. Note that in this position, the movement of the trailer with respect to the hitch bar 22 and towing vehicle is in no way affected and does not in any way interfere with the cornering of the trailer with respect to the towing vehicle. Also, by the housing cover 30 completely cantilevering over the cam lever 26 and socket lock mechanism 24, it is not possible to unlock the coupler trailer lock mechanism 52 from the towing vehicle. When it is desirous to unlock the trailer from the towing vehicle, the coupler trailer lock mechanism 52 is opened with the key lock to remove the pin lock mechanism from the pivotal housing cover 30 and its associated housing base 28, so that the pivotal housing cover 30 can be pivoted to an upward position as shown in FIGS. 3 and 4 thereby allowing unimpeded access to the user to the cam lever 26 of the socket lock mechanism 24 in order to unlock the trailer tongue 12 from the spherical ball member 20 to remove the trailer from the hitch bar 22 and associated towing vehicle. Once the trailer is removed from the towing vehicle, the protective housing 10 also prevents unauthorized access to the conventional socket lock mechanism 24 when the trailer is parked and/or is disconnected from the towing vehicle so as to prevent tampering or theft of the trailer and its contents. For this purpose, a partial spherical ball member 54 is mounted to a support plate member 56. The partial spherical ball member 54 is thereafter mounted into the conventional interior spherical socket surface 18 of the spherical socket housing 16 of the trailer tongue 12 and the cam lever 26 is actuated to a downward position in order to trap the partial spherical ball member 54 within the interior spherical socket surface 18 as is conventionally accomplished when the trailer is attached to the hitch bar 22 of the towing vehicle. After the socket lock mechanism 24 is operated to a locked position by the cam lever 26, the protective housing cover 30 is pivoted to a downward position and thereafter, the coupler trailer lock mechanism 52 is inserted into the apertures 46, 48 of the housing base 28, as well as those of the housing cover 30 and locked into place with the key. By locking the partial spherical ball member 54 and associated support plate member 56 into the spherical socket housing 16, this completely prevents the trailer tongue 12 of the trailer from being mounted to anything and as a result, it is not possible to hook up the trailer tongue 12 to any towing vehicle using the standard tongue and ball arrangement as discussed herein. Accordingly, the use of the partial spherical ball member 54 and support plate member 56 completely prevents any attempt to hook up to the unattended trailer and thwart any attempt to the unauthorized use of the trailer.

While the present invention has been described in terms of a preferred embodiment, it is apparent that other forms could be adopted by one skilled in the art. In other words, the teachings of the present invention encompass any reasonable substitution or equivalents of the claim limitations. Accordingly, the scope of the present invention is to be limited only by the following claims.

What is claimed is:

1. An anti-theft protective housing adapted to be mounted on a trailer tongue of a trailer vehicle which is attached to a towing vehicle using a conventional ball and socket lock arrangement, said protective housing comprising:
   a housing base;
   means for attaching said housing base to a top surface of said trailer tongue;
   a housing cover having one end pivotally mounted to said housing base;
   means for locking said housing cover to said housing base whereby removal of said locking means allows said housing cover to pivot with respect to said housing base from an open position for easy access to said ball and socket lock arrangement to a closed position such that said housing cover extends from said housing base to completely cover said ball and socket lock arrangement and thereby prevent theft of said trailer vehicle when said locking means is in use, said means for locking further comprising means for locking said ball and socket arrangement when said trailer vehicle is disconnected from said towing vehicle.

2. The protective housing as claimed in claim 1 wherein said means for attaching said housing base to said trailer tongue further comprises means for spacing said housing base a predetermined distance from said ball and socket lock arrangement.

3. The protective housing as claimed in claim 1 further comprising means for locking said housing cover to said housing base whereby said locking means prevents said housing cover from pivoting with respect to said housing base.

4. The protective housing as claimed in claim 1 wherein said means for attaching said housing base to said top surface of said trailer tongue cannot be accessed when said housing cover is in said closed and locked position.

* * * * *